US007502107B2

(12) United States Patent
Mohanty et al.

(10) Patent No.: US 7,502,107 B2
(45) Date of Patent: Mar. 10, 2009

(54) APPARATUS AND METHOD FOR TRANSPORT OF MICROSCOPIC OBJECT(S)

(75) Inventors: Samarendra Kumar Mohanty, Indore (IN); Pradeep Kumar Gupta, Indore (IN)

(73) Assignee: Secretary, Department Of Atomic Energy, Government of India, Mumbai (IN)

( * ) Notice: Subject to any disclaimer, the term of this patent is extended or adjusted under 35 U.S.C. 154(b) by 172 days.

(21) Appl. No.: 10/569,047

(22) PCT Filed: Aug. 22, 2003

(86) PCT No.: PCT/IN03/00277

§ 371 (c)(1),
(2), (4) Date: Jan. 23, 2007

(87) PCT Pub. No.: WO2005/020244

PCT Pub. Date: Mar. 3, 2005

(65) Prior Publication Data

US 2007/0146714 A1 Jun. 28, 2007

(51) Int. Cl.
*G01J 3/30* (2006.01)

(52) U.S. Cl. ...................................................... 356/317

(58) Field of Classification Search ................. 356/317, 356/318, 335–337

See application file for complete search history.

(56) References Cited

U.S. PATENT DOCUMENTS

| | | | | |
|---|---|---|---|---|
| 4,887,721 | A | 12/1989 | Martin et al. | |
| 5,212,382 | A | 5/1993 | Sasaki et al. | |
| 5,363,190 | A | 11/1994 | Inaba et al. | |
| 5,998,129 | A | 12/1999 | Schütze et al. | |
| 6,833,542 | B2 * | 12/2004 | Wang et al. | 250/251 |
| 2005/0017161 | A1 * | 1/2005 | Grier et al. | 250/251 |

FOREIGN PATENT DOCUMENTS

| | | |
|---|---|---|
| WO | WO 0023825 | 4/2000 |

OTHER PUBLICATIONS

Gorlitz, A. et al., "Bose-Einstein Condensates In A Large-Volume Optical Trap", Washington, D.C.: Opt. Soc. America (2001) p. 197 para. 0002!, ISBN 1-55752-663-X, XP002273760.

Gutu, I. et al. "Surface Treatment With Linearly Polarized Laser Beam At Oblique Incidence", Opt. Laser Technol. (UK), Optics And Laser Technology, Elsevier, U.K., vol. 34, No. 5, Jul. 2002, pp. 381-388, XP002273761, ISSN: 0030-3992, p. 381, para. 1; p. 382, left-hand column, last paragraph.

(Continued)

*Primary Examiner*—Kara E Geisel
*Assistant Examiner*—Abdullahi Nur
(74) *Attorney, Agent, or Firm*—Volpe and Koenig, P.C.

(57) ABSTRACT

A system and the method for transport of microscopic objects/particles involving the use of laser source operatively connected to a microscope objective which is adapted to generate optical focal spots on said particle(s) with asymmetric intensity profile in transverse plane followed by varying the said asymmetry of the gradient optical forces on the micron sized object/particles to thereby transport the microscopic object(s). The system and the method can be used to transport microscopic objects including i) transportation of cells and intra-cellular organelles, ii) acceleration of microscopic objects along any direction in a plane transverse to the direction of propagation of laser beam, iii) optical channeling of objects through a micro-capillary from one micro-well to another and transfer to another channel after desired processing, iv) sorting of microscopic objects, v) optical control of micro-machines, micro-fluidic devices etc.

21 Claims, 6 Drawing Sheets

OTHER PUBLICATIONS

Carter, W. H., "Spot Size And Divergence For Hermite Gaussian Beams Of Any Order", Appl. Opt. (USA), Applied Optics, U.S.A., vol. 19, No. 7, Apr. 1, 1980, pp. 1027-1029, XP0001188188, ISSN: 0003-6935, p. 1027, para. 1, p. 1028, right-hand column, para. 6, p. 1029, last para.
Ashkin A., 'Acceleration and Trapping of Particles by Radiation Pressure' *Phy. Rev. Lett.*, 24(4) (1970), pp. 156-159.
Buican, T.N., et al., 'Automated Single-Cell Manipulation And Sorting By Light Trapping', *Applied Optics*, 26(24) (1987), pp. 5311-5316.
Uchida, M., M. Sato Maeda, and H. Tashiro, 'Whole-cell Manipulation by Optical Trapping', *Current Biology*, 5(4) (1995), pp. 380-382.
Kuo, S. C. and M. P. Sheetz, 'Optical Tweezers in Cell Biology', *Trends Cell Biol.* 2 (1992), pp. 116-119.
Weber, G. and K.O. Greulich, 'Manipulation of Cells, Organelles, and Genomes by Laser Microbeam and Optical Trap', *Int. Rev. Cytol.* 133 (1992) p. 1-41.
Block, S. M., 'Optical Tweezers: A New Tool For Biophysics', *Non-invasive Techniques in Cell Biology*, J. K. Foskett and S. Grinstein, ed., New York: John Wiley and Sons (1990), pp. 375-402.

* cited by examiner

APPARATUS AND METHOD FOR TRANSPORT OF MICROSCOPIC OBJECT(S)

FIELD OF THE INVENTION

The present invention relates to an apparatus and a method for transport of microscopic objects. In particular, the apparatus and the method of the invention are directed to the transport of microscopic objects including i) transportation of cells and intra-cellular organelles, ii) acceleration of microscopic objects along any direction in a plane transverse to the direction of propagation of laser beam, iii) optical channeling of objects through a micro-capillary from one micro-well to another and transfer to another channel after desired processing, iv) sorting of microscopic objects, v) optical control of micro-machines, micro-fluidic devices etc. Importantly the apparatus and the method of the invention would have use in various biotechnological and micro electromechanical systems.

BACKGROUND ART

Various systems and methods for transportation of microscopic objects for various applications are presently in use.

U.S. Pat. No. 5,998,129 discloses the use of photokinetic impulse from pulsed laser beam to transport cells or a portion of tissue section that has been cut by the laser beam or by any other method. Due to the impulse the object to be transported is accelerated and transferred to a container placed behind the objects. However the use of photo-kinetic impulse from a pulsed laser beam to transport the microscopic objects can neither be used for intra-cellular transport nor transport in transverse plane (plane perpendicular to laser beam propagation).

U.S. Pat. No. 4,887,721 involves another method where the transportation of cells is attained by axial light scattering force and uses a weakly focused or collimated laser beam. In this method the scattering force dominates axial gradient force and the particle is propelled along the direction of the beam. (Other references which teach such similar method include Ashkin et. al, Phy.Rev.Lett., 24(4), 156-159(1970); Buican et. al., Applied Optics, 26 (24), 5311-5316 (1987); M. Uchida, M. Sato Maeda and H. Tashiro, Current Biology, 5(4), 380-382 (1995)). However, in this method of transportation, axial light scattering force can lead to transportation only in the direction of light generating the scattering force and transportation in directions other than this require use of additional beams and fabrication of special chambers and is therefore not generally applicable. Further such method cannot be used for intra-cellular transport and transport in transverse plane (plane perpendicular to laser beam propagation).

WO 0023825 discloses the use of laser light to trap particles within a hollow region of a hollow core optical fiber and transport the trapped particles along the fiber. Laser induced optical gradient forces trap the particles close to the center of the fiber and axial scattering force propels along the length of the hollow fiber. Such method of laser guided transport of particles inside hollow optical fiber cannot be used for intra-cellular transport and is also limited by maneuverability of the guiding optical fiber.

U.S. Pat. No. 5,212,382 discloses yet another method of transporting optically trapped objects by scanning the trapping beam or the microscope stage. (Similar method is also disclosed by Block, S. M., Non-invasive technique in cell biology. J. K. Foskett and S. Grinstein, ed., New York, John Wiley and sons 375-402(1990); Kuo, S. C., and Sheetz, M. P., Trends Cell Biol. 2, 116-119 (1992); Weber, G., and Greulich, K. O., Int. Rev. Cytol. 133, 1-41 (1992)). While this method is most obvious method of optical transport the same has also certain limitations in terms of speed and the number of particle that can be transported simultaneously.

U.S. Pat. No. 5,363,190 discloses a method and system for optical trapping of object in a laser beam having a non-rotational symmetrical spatial property distribution and transport of the trapped object from one position on the specimen stage to the other by either moving the trap beam itself or by moving the specimen stage. Here the use of a non-rotational symmetrical elliptical trap beam helps orient an asymmetric object along the major axis of the trap beam and thus the object can be rotated in a plane transverse to the propagation direction of the trap beam by rotation of the laser trap beam. However, the method and system disclosed herein can only be used for transportation of a trapped object in the said manner and therefore suffers with the same limitations as for U.S. Pat. No. 5,212,382. Further, it cannot be used for channeling, accelerating and sorting of microscopic objects.

OBJECTS OF THE INVENTION

It is thus the basic object of the present invention to provide for a system and a method for transportation, channeling, acceleration and sorting of microscopic objects, which would not have the aforesaid limitations of conventional systems and methods and would also be effective in intra-cellular transport and for transportation in the transverse plane.

Another object of the present invention is to provide for a system and method for transportation of any microscopic objects/particles on which optical gradient force can act to facilitate optical transport in the plane transverse to the direction of propagation of the laser beam without the need for any scanning device.

Yet further object of the present invention is to provide for a system and method for controlled optical transportation of microscopic objects in transverse plane wherein the sense, speed as well as the direction of transport can be fully controlled.

Yet further object is directed to provide a system and method for optical transportation of microscopic objects, which would enable transportation of ensemble of particle at a very high rate.

Yet further object of the present invention is to provide for a system and method for optical transportation of microscopic objects, which would be capable of transporting objects of varying dimensions ranging from sub-micron to few tens of microns.

Yet another object is to provide for a system and method for optical transportation of microscopic objects, which would be simple to realize and carry out.

Yet further object of the present invention is directed to provide a system and method for transport of microscopic objects involving excitation/illumination of the objects with or without labeling with fluorescence dyes for study of fluorescence/scattering of objects.

SUMMARY OF THE INVENTION

Thus according to the basic aspect of the present invention there is provided a system for transport of microscopic objects/particles comprising:

i) a specimen stage to support the micron sized object/particle(s);

ii) a laser source;

iii) said laser source operatively connected to a microscope objective and adapted to generate optical focal spots on said particle(s); and iv) means to vary the said asymmetry of the gradient optical forces on the micron sized object/particles to thereby transport the microscopic object(s).

characterized in that said gradient optical forces are asymmetric about the mid point of the major axis of an elliptic beam, such that said system for transport of the objects/particles is adapted to allow control of both direction and speed of transport of said object where the speed of particle transport is controllable by regulating the optical beam power and/or by varying the degree of asymmetry in the intensity profile of said elliptic laser beam and where the direction of said particle transport is adapted to be controlled by rotating the direction of the major axis of said elliptic laser beam until alignment with the desired angle in the transverse plane.

In the above system the said particles are supported by said specimen stage in a selective medium having refractive index lower than that of the particles and an illumination source is provided as in a conventional microscope.

According to an aspect of the present invention there is provided a system for transport of microscopic objects comprising:

i) a translatable specimen stage to support the micron sized particles;

ii) a laser source operating in zero order Hermite Gaussian mode adapted to have a control on power of output laser beam;

iii) means to direct the said laser beam toward an area of stage where said objects are located;

iv) means to focus the laser beam into an elliptical profile of desired dimension at the desired point on said stage;

v) means to provide the laser beam to the microscope objectives at controllable angles so as to vary the asymmetry of gradient optical forces on the particles and transport the said particles along the major axis of the elliptical focus in the transverse plane perpendicular to direction of the propagation of laser beam;

According to another aspect of the present invention there is provided a system for transport of microscopic objects comprising:

i) a translatable specimen stage to support the micron sized particles;

ii) a laser source operating in zero order Hermite Gaussian mode and adapted to have a control on power of output laser beam;

iii) means to direct the said laser beam toward an area of stage where said objects are located;

iv) means to focus the laser beam into an elliptical profile of desired dimension at the desired point on said stage;

v) means to provide the laser beam to the microscope objectives at controllable angles so as to vary the asymmetry of gradient optical forces on the particle and transport the said particles along the major axis of the elliptical focus in the transverse plane perpendicular to direction of the propagation of laser beam;

vi) means to control the direction of transportation of the said microscopic objects along the major axis of the elliptical focus in the transverse plane perpendicular to direction of the propagation of the laser beam; and vii) means to monitor the motion of said transported objects.

In the above apparatus of the invention laser source is selected so as to provide a wavelength such that the objects and said medium have low absorption at that wavelength. The means for focusing is adapted such that the external focusing elements determine the length of major axis along which the particles are transported.

According to yet further aspect of the present invention there is provided a system for transport of microscopic objects comprising:

i) a translatable specimen stage to support the micron sized particles;

ii) a laser source operating in zero order Hermite Gaussian mode and adapted to control the power of output laser beam;

iii) means to direct the said laser beam toward an area of stage where said objects are located;

iv) means to focus the laser beam into an elliptical profile of desired dimension at the desired point on said stage;

v) means to provide the laser beam to the microscope objectives at controllable angles so as to vary the asymmetry of gradient optical forces on the particle and transport the said particles along the major axis of the elliptical focus in the transverse plane perpendicular to direction of the propagation of laser beam.

vi) means to control the direction of transportation of the said microscopic objects along the major axis of the elliptical focus in the transverse plane perpendicular to direction of the propagation of the laser beam;

vii) means to monitor the motion of said transported objects.

According to another aspect of the present invention there is provided a method for transport of microscopic objects comprising:

i) providing said micron sized particle(s)/objects on a specimen stage;

ii) operating a laser source operatively connected to a microscope objective such as to generate optical focal spots on said particles/objects with asymmetric intensity profile in transverse plane; and iii) varying the said asymmetry of the gradient optical forces on the micron sized particles/objects to thereby transport the microscopic object.

characterized in that said gradient optical forces are asymmetric about the mid point of the major axis of an elliptic beam, such that said system for transport of the objects/particles is adapted to allow control of both direction and speed of transport of said object where the speed of particle transport is controllable by regulating the optical beam power and/or by varying the degree of asymmetry in the intensity profile of said elliptic laser beam and where the direction of said particle transport is adapted to be controlled by rotating the direction of the major axis of said elliptic laser beam until alignment with the desired angle in the transverse plane.

In the above method the said selective medium for holding the micron sized particles is selected such as to have refractive index lower than that of the particles and an illumination source as in a conventional microscope.

According to another aspect there is provided a method for transport of microscopic objects using the system of the invention as discussed above comprising:

i) providing the micron sized particle(s) in a translatable specimen stage;

ii) operating a laser source in zero order Hermite Gaussian mode and controlling the power of output laser beam;

iii) directing the said laser beam toward an area of stage where said objects are located;

iv) focusing the laser beam into an elliptical profile of desired dimension at the desired point on said stage;

v) providing the laser beam to the microscope objectives at controlled angles so as to vary the asymmetry of gradient optical forces on the particles and transport the said particles along the major axis of the elliptical focus in the transverse plane perpendicular to direction of the propagation of laser beam.

According to another preferred aspect, the method for transportation of particles using the system of the invention comprises:

i) providing the micron sized particles on a translatable specimen stage;

ii) operating a laser source in zero order Hermite Gaussian mode and controlling the power of output laser beam;

iii) directing the said laser beam toward an area of stage where said objects are located;

iv) focusing the laser beam into an elliptical profile of desired dimension at the desired point on said stage;

v) providing the laser beam to the microscope objective at controlled angles so as to vary the asymmetry of gradient optical forces on the particle and transport the said particles along the major axis of the elliptical focus in the transverse plane perpendicular to direction of the propagation of laser beam.

vi) controlling the direction of transportation of the said microscopic objects along the major axis of the elliptical focus in the transverse plane perpendicular to direction of the propagation of the laser beam; and vii) monitoring the motion of said transported objects.

In the above method of the invention a laser is used such that the objects and said medium have low absorption at its output wavelength. The means for focusing is used such that the external focusing elements determine the length of major axis along which the particles are transported.

According to yet further preferred aspect of the present invention the method for transport of microscopic objects using the system discussed above for studying fluorescence/scattering of said objects comprises:

i) supporting micron sized particles in said translatable specimen stage and illuminating the same;

ii) selecting the laser wave length such that the objects to be transported have low absorption at the wave length and also have refractive index higher than that of the medium;

iii) controlling the power of output laser beam;

iv) directing the laser beam toward an area of the stage where the objects are located;

v) focusing of the said laser beam into an elliptical profile of the desired dimension at the desired point on the said stage;

vi) providing the laser beam to the microscope objective at controlled angles so as to exert asymmetric gradient optical forces of the particle;

vii) placing a single or multiple microscopic objects on said stage near the region of high intensity gradient of the said elliptical shaped focal spot of said laser beam;

viii) transporting the particles along the major axis of the elliptical focus in the transverse plane perpendicular to direction of propagation of laser beam;

ix) controlling the direction of transportation of the said microscopic objects along the major axis of the elliptical focus in the transverse plane perpendicular to direction of propagation of the laser beam;

x) monitoring the direction, sense and speed of transportation of said objects, digitizing and recording video images of the objects;

xi) carrying analysis of successive said images for measuring directions and/or speed of transportation of said trapped objects;

xii) exciting/illuminating of transported objects labeled/unlabelled with fluorescence dyes and studying fluorescence/scattering of said objects.

The system of the invention therefore enables a continuous and controlled transport and projection of microscopic objects using asymmetric gradient force in the transverse plane perpendicular to the direction of the propagation of the laser beam.

Importantly, the apparatus is adapted to simultaneously transport hundreds of particles along the 40 μm long major axis of the elliptical focal spot in about 10 sec. Also the above apparatus and method enables transport of objects varying in sizes from sub-microns to tens of microns.

In particular, according to the present invention, the lowest transverse mode output of the laser is coupled to the microscope objective at a large angle with respect to the optic axis of the object and focal spot with asymmetric intensity profiles in transverse plane is generated. In such focal spot, asymmetric gradient forces leading to asymmetric potential well are created. Because in such beam profile, microscopic objects experience unequal forces on the two sides of the asymmetric profiles, the objects would enter from the side having strong attractive potential (corresponding to higher gradient force/stiffness) and escape along the direction having lower stiffness. The asymmetric potential thus serves as a one-way valve and by controlling the direction of asymmetry; the entrance and exit direction of the object can be controlled.

By using a single or suitable combination of cylindrical lenses, elliptical focus spots of varying dimensions can be created. Further by controlling the angle the laser beam makes with the optic axis of the cylindrical lens, desired intensity asymmetry along the major axis of the elliptical focus can be created and used for transport of particles from one point to another along the length of the major axis. Degree of asymmetry in the intensity profile can be controlled by changing the angle of incidence of the laser beam with respect to the optic axis of the spherical/cylindrical lens. Because the force by which the object can be accelerated is determined by the degree of asymmetry in the intensity profile, the acceleration and/or the speed of the particle can be controlled.

Also, in the system of the invention by rotating the cylindrical lens, the direction of the major axis of the elliptical focus can be rotated from 0-360° in the transverse plane. Thus the objects can be transported along any axis in the transverse plane in a controlled manner.

Importantly, since the asymmetric gradient force and thus the acceleration or velocity of projection depends on the optical and geometric properties of particles, sorting of different particles based on difference in these properties is possible.

The system of the invention for optical transport of microscopic objects thus incorporate a laser coupled to a microscope objective, for exerting optical forces on microscopic objects.

In the system and method of the invention the dependence of asymmetric forces on the optical and geometrical parameters of particles can be used for measuring these parameters for the particles.

Also, by use of multiple laser beams from one or several lasers or by use of spatial light modulators/diffractive optical elements, network of paths along which microscopic objects can be transported can be set in the transverse plane. This alone or in combination with microfluidic devices would provide wide range of application in cell and molecular biology, colloidal sciences and optically driven micro-machines. Several such asymmetric intensity profiles can be generated and driven independently.

BRIEF DESCRIPTION OF THE DRAWINGS

Details of the invention, its objects and advantages are explained hereunder in greater detail in relation to non-limiting exemplary illustrations of the system and method in relation to the accompanying figures wherein.

Figure 1:
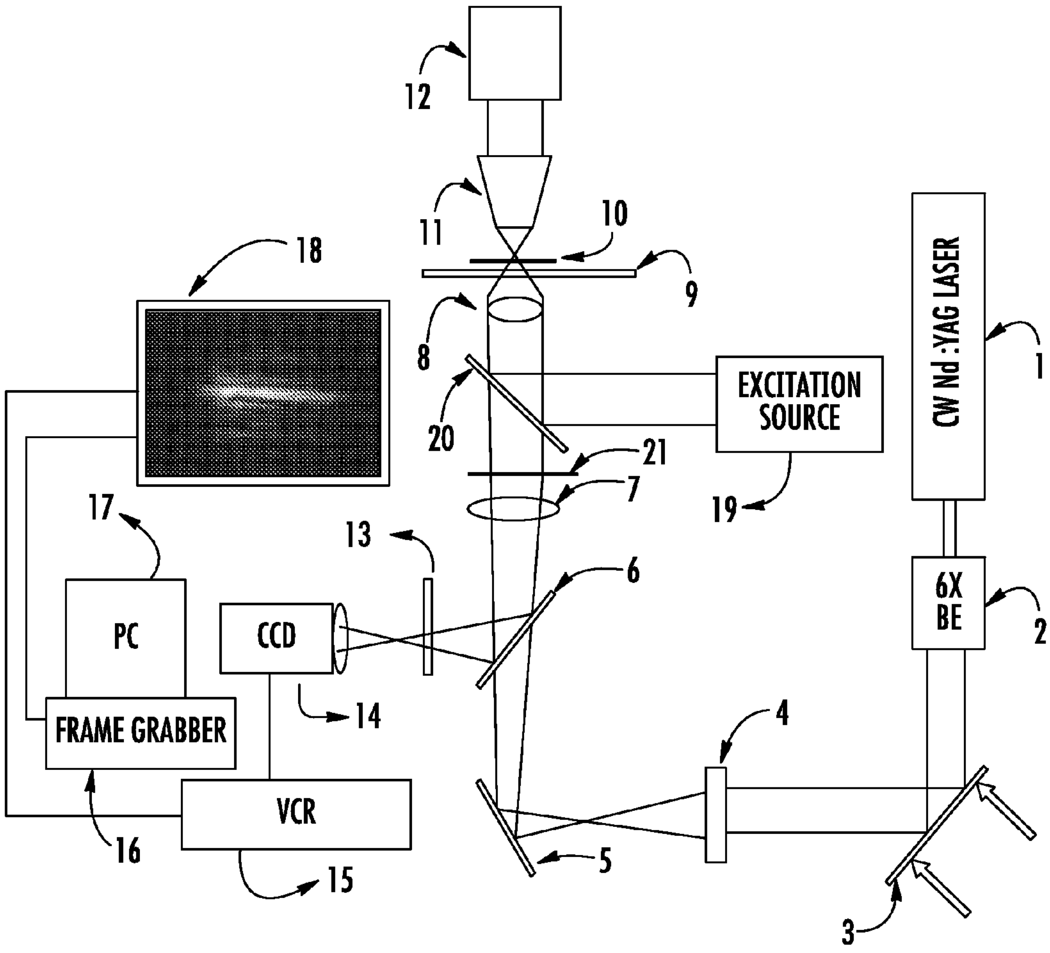
FIG. 1 is a block diagram of the system of the invention.

Reference is first invited to FIG. 1, which illustrates by way of a block diagram the system for the transport of microscopic objects in accordance with the present invention.

DETAILED DESCRIPTION OF THE INVENTION

As shown in said FIG. 1, a zero order Hermite-Gaussian ($TEM_{00}$) mode output of 1064 nm cw Nd: YAG laser (1) is expanded using a beam expander (2), steered through beam-steering device (3) and coupled to a 100× microscope objective (8) through a combination of cylindrical (4) and spherical lenses (7). The laser beam is focused to an elliptical spot in the specimen plane of the microscope. The beam expander (2) is a combination of two convex lenses of focal lengths 25 mm and 150 mm, placed at a distance of 175 mm to expand and collimate the beam from 1.5 mm to 9 mm. The beam-steering device (3) consists of three mirrors required to steer as well as align the beam with respect to the cylindrical lens (4) and the microscope objective (8). The cylindrical lens (4) has focal length of about 200 mm and is placed externally to the microscope at a distance of about 400 mm from the about 200 mm focal length tube lens (7) present inside the microscope. The laser beam was coupled to the microscope through a mirror (5) that was mounted in a tiltable mirror mount, and a dichroic beam splitter (6). The combination of cylindrical and tube lens provides a collimated elliptic beam to the microscope objective. The cylindrical lens is placed in a rotating mount, with clear aperture of about 20 mm to transmit the expanded beam. The 100× Microscope objective (8) used was a Plan Neofluor phase objective (N.A.=1.3). The specimen stage (9) was provided to hold the microscopic objects on a thin (~100 microns) coverslip (10) and move it in X and Y direction(s). A halogen lamp was used as an illumination source (12), the visible light was focused through a condenser (11) having N.A.=0.55 to illuminate the sample on the coverslip. The visible light is reflected by the dichroic beam splitter (6). A commercial video CCD camera (14) with monitor (18) was used to visualize the trapping and transport of the microscopic object(s). To prevent the back-scattered laser light reaching the CCD detector, an IR cut-off filter (13) was used. The motion of trapped object was recorded on a videocassette using a VCR (15). These images were digitized using a frame grabber (16) and computer (17). The translation speed, acceleration etc. was measured by analyzing the position of the moving object(s) in successive frames.

In the above system of the invention when lowest transverse mode output of the laser is coupled to the microscope objective through a cylindrical lens at a large angle with respect to the optic axis of the objective, elliptical focal spot with asymmetric intensity profile(s) in transverse plane is generated. Microscopic object(s) on the coverslip that are to be transported are placed near one end of the elliptical focus having strong attractive potential (corresponding to higher gradient force/stiffness) by translation of the stage or the beam. Then laser power is increased so as to exert sufficient optical forces on the object. The object(s) can be seen to move along the major axis of the elliptic focus and escape from the end of the focused spot having lower stiffness. Choice of cylindrical lens(es) determines the length of major axis of the elliptical focus spot over which the particle(s) can be transported. For controlling the speed of transport, the degree of asymmetry in the intensity profile was controlled by changing the angle of incidence of the laser beam with respect to the optic axis of the microscope objective. To change the direction of transport, the cylindrical lens was rotated so as to rotate the direction of major axis of the elliptical focus by the desired angle in the transverse plane.

Figure 2:
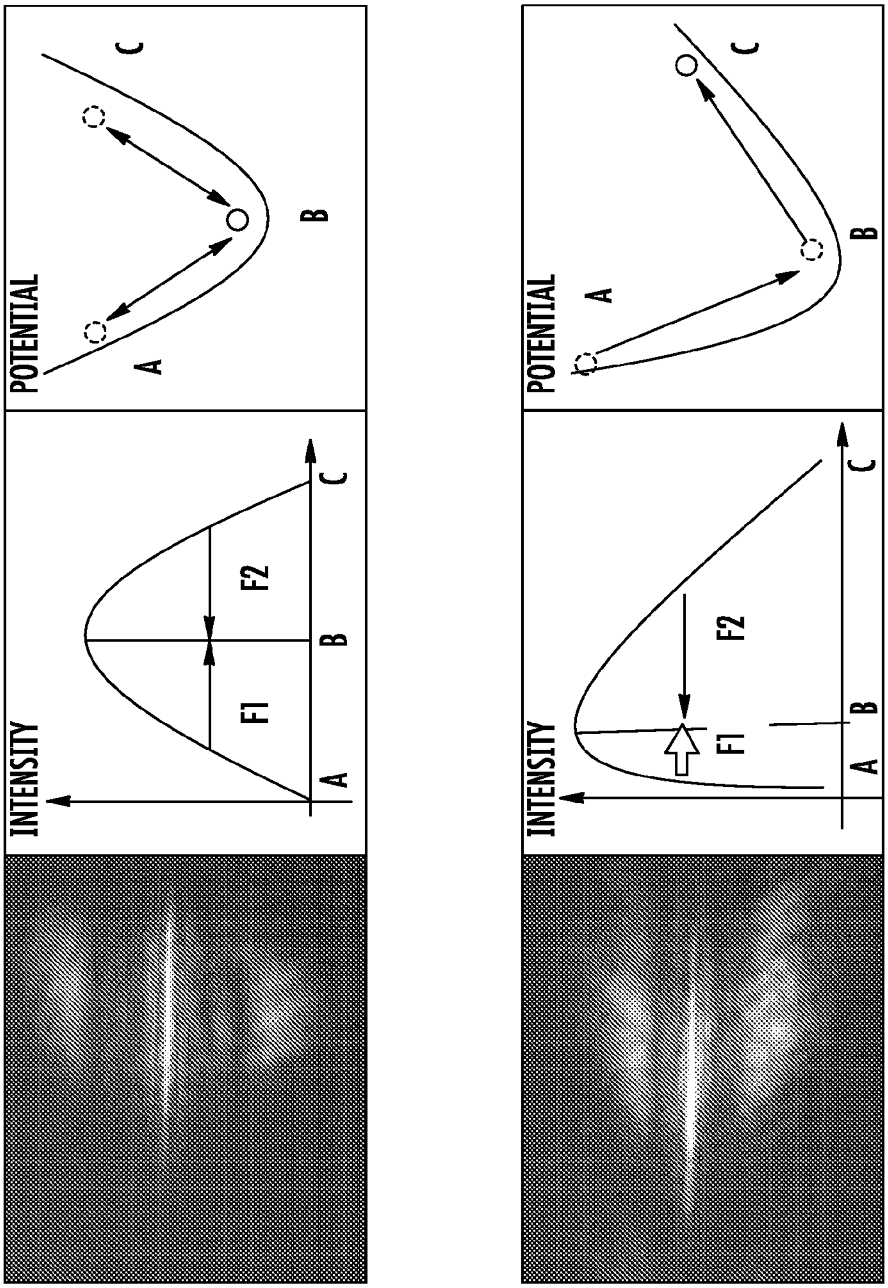
FIG. 2 schematically illustrates the principle of operation.

The principle of operation of the system is of the invention is explained further in relation to FIG. 2.

As shown in said FIGS. 2*a* and 2*b,* in case of a symmetric elliptic trap, the intensity gradient from the center of the beam (B) is the same in both directions (B to A and from B to C, along the major axis of the trap). Therefore the particle will be trapped at the center (B) as shown in said FIG. 2*b*. On the other hand, in case of an asymmetric elliptic trap in accordance with that provided for by the system of the invention and as shown in FIGS. 2(*c*) and 2(*d*), the intensity gradient about the center of beam profile is asymmetric. Intensity gradient from B to A is greater than that from B to C. Therefore, particle will be attracted from higher intensity gradient side (A) and escape from the side(C) as shown in FIG. 2(*d*).

Figure 3:
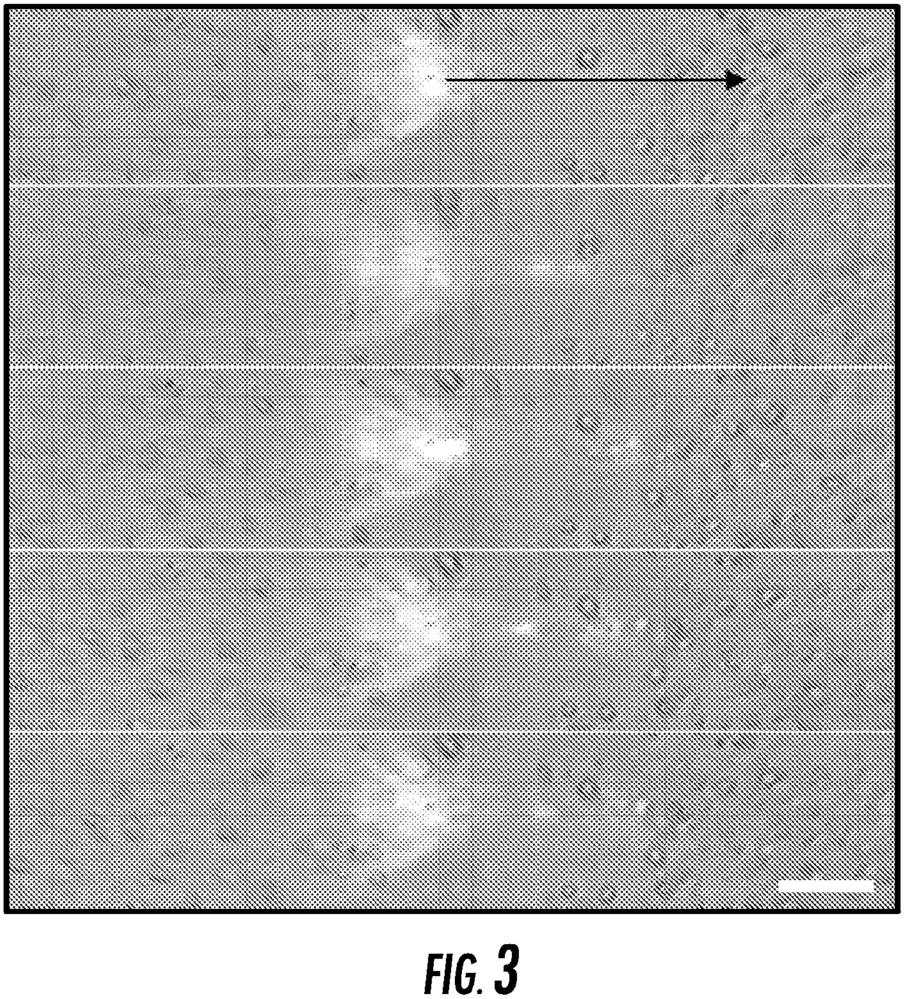
FIG. 3 is a digitized video image of transport of polystyrene microspheres (diameter ~2 μm)

Some exemplary methods of transportation of polystyrene microspheres were carried out using the above system of the invention as discussed hereunder:

A solution of polystyrene microspheres of diameter ~2 microns (with approximately $10^6$ polystyrene microspheres/ml), was placed on a coverslip, and brought near the higher intensity gradient end of the major axis of the elliptical focus by translation of the specimen stage. With 50 mW laser power at the object plane the particles could be transported at speeds of up to 2 microns/sec. The transportation speed increased with increasing power and reached ~10 microns/sec at 200 mW power at the object plane. For studying the transport, the bright field transmission image of the particles on the coverslip illuminated by a halogen lamp as well as back scattered laser light from the particles was recorded on CCD camera. A montage of digitized time-lapse video images of transportation of particles along the major axis of the elliptical focus is shown in FIG. 3.

By rotating the cylindrical lens, the direction of transport could be varied from 0 to 360 degrees in the transverse plane. By varying the angle of the laser beam with respect to the objective, via change of tilt of the external coupling mirror, speed of particles could also be varied.

Figure 4:
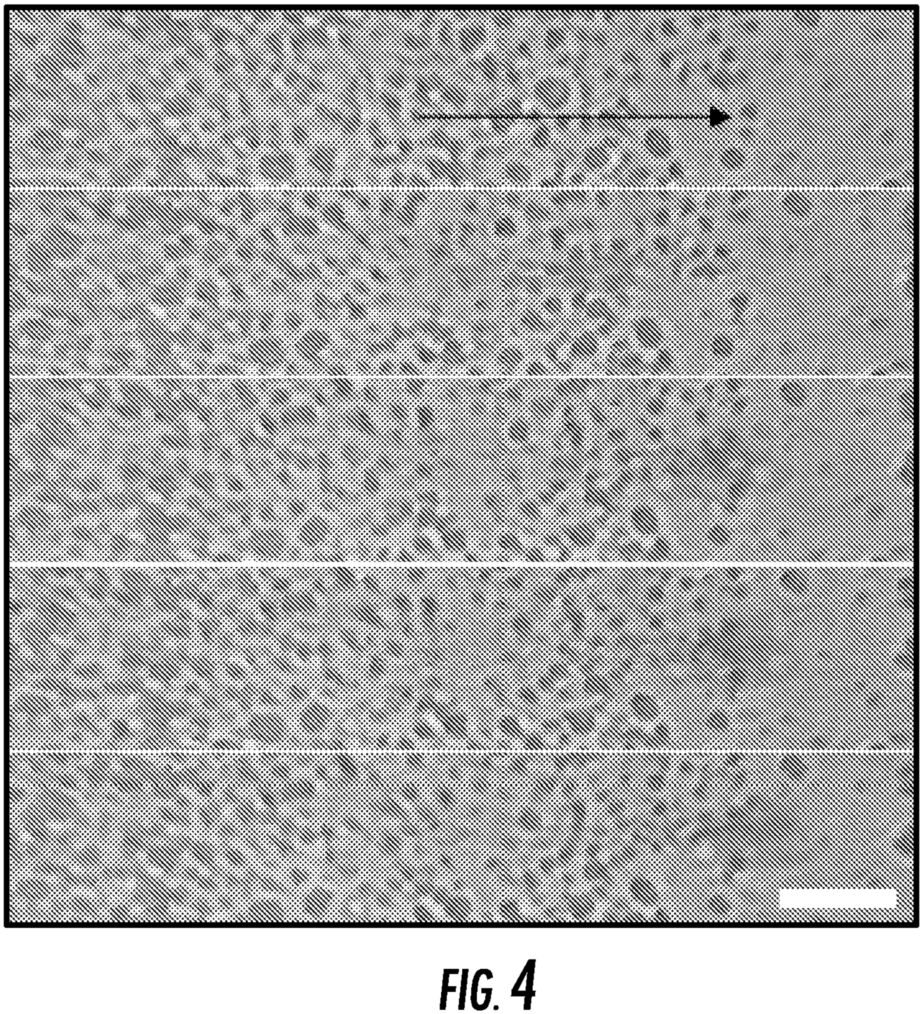
FIG. 4 is a bright field digitized video image of transport of silica particles of sizes varying from 1-5 microns.

FIG. 4 shows a montage of digitized time-lapse video images of transportation of a collection of silica particles of varying size (1-5 microns). An increase in the angle of the beam with respect to the objective led to a change in the asymmetry of the intensity gradient and thus resulted in increase in speed of transportation. With 200 mW of beam power at specimen stage it was possible to simultaneously transport hundreds of particles at a speed of ~20 microns/s along the 40 μm long major axis of the elliptical profile within 10 seconds. The bigger particles (~5 μm) were found to lag behind the small particles (~1 μm).

Figure 5:
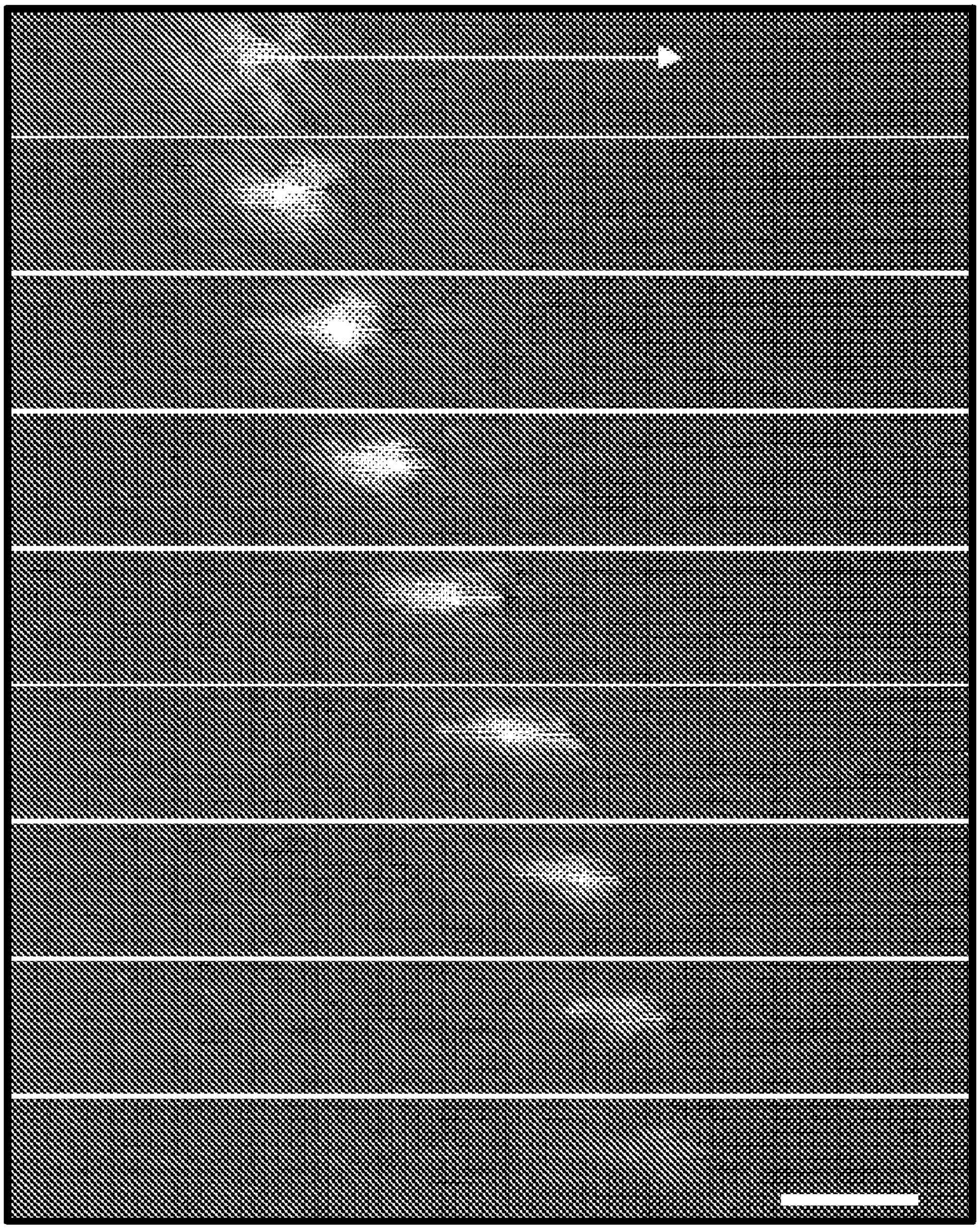
FIG. 5 is a digitized video image of transport of a silica particles of size >5 μm based on laser light back scattered by the particles.

Using the above system and method of the invention it was also possible to transport particles as big as few tens of microns along the major axis of the elliptic focus without using any scanning mechanism. A montage of digitized time-lapse video images of transport of a silica particle of size >5 microns is shown in FIG. 5. The back-scattered intensity increases fast for a very short distance (about 5 microns from the left hand side) and then decreases slowly (over 35 microns) as the particle moved forward. Since the observed back-scattered intensity should probe the laser profile, this observation confirmed that the particle entered from high intensity gradient side and exited from low intensity gradient side.

Figure 6:
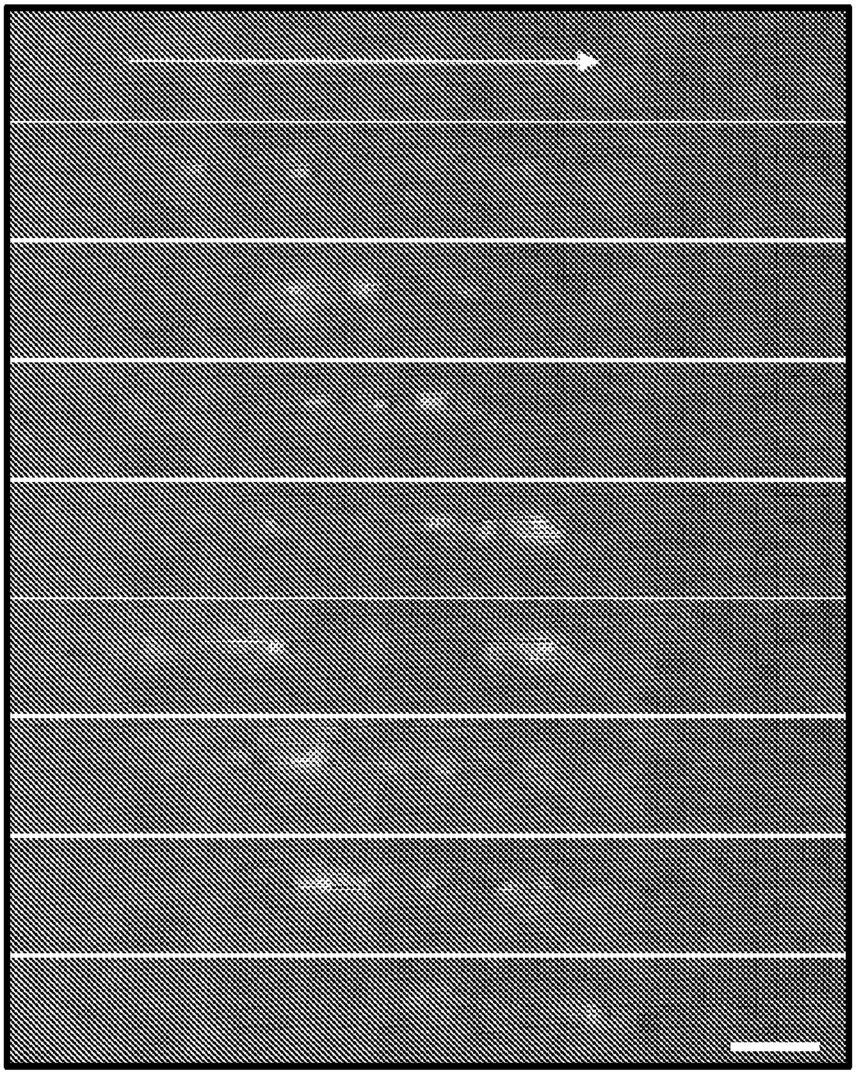
FIG. 6 is a digitized video image of transport of polystyrene nano-particles of size 200 nm based on laser light back scattered by the particles.

FIG. 6 shows a montage of digitized time-lapse video images of transportation of a collection of nano-particles of sizes ~200 nm. In this case, as the particle size was less, the back-scattered intensity was very weak as compared to that observed for bigger particle (FIG. 5).

The above examples demonstrate the optical transportation of microscopic objects in the plane transverse to the direction of propagation of the laser beam using the system of the invention. Importantly, the system and method of the invention is applicable to any particle on which optical gradient force can act and does not require scanning device. Also, the system achieves fully controlled transport in transverse plane, i.e. the sense, speed, direction of transport is fully controllable and provides for possible transport of ensemble of particles at a very high rate. The system and the method can be used to transport object(s) with dimension ranging from sub-micron to few tens of microns. The system is very user-friendly and can be used to carry out method of transportation of microscopic objects including intra-cellular transport avoiding the limitations of the existing devices for transport of microscopic objects.

The invention claimed is:

1. A system for transport of microscopic object/particles comprising:

i) at least one specimen stage to support microscopic object/particles;

ii) at least one laser source;

iii) said laser source operatively connected to microscope objective and adapted to generate gradient optical forces on the microscopic object/particles to thereby transport the microscopic object;

characterized in that said gradient optical forces are asymmetric about the mid point of the major axis of an elliptic laser beam, such that said system for transport of the objects/particles is adapted to allow control of both direction and speed of transport of said object where the speed of particle transport is controllable by regulating the optical beam power and/or by varying the degree of asymmetry in the intensity profile of said elliptic laser beam and where the direction of particle transport is adapted to be controlled by rotating the direction of the major axis of said elliptic laser beam until alignment with the desired angle in the transverse plane.

2. A system as claimed in claim 1 comprising of said specimen stage a medium with refractive index lower than that of the particles and an illumination source.

3. A system as claimed in claim 1 comprising:

i) a translatable specimen stage to support micron sized particles in a selective medium;

ii) a laser source operating in zero order Hermite Gaussian mode adapted to have a control on power of output laser beam;

iii) means to direct the laser beam toward an area of stage where said particles are located;

iv) means to focus the laser beam into an elliptical profile of desired dimension at the desired point on said stage;

v) means to provide the laser beam to the particles at controllable angles so as to vary the asymmetry of gradient optical forces about the mid point of the major axis of the elliptic beam on the particle and transport the said particles along the major axis of the elliptical focus in the transverse plane perpendicular to direction of the propagation of laser beam.

4. A system as claimed in claim 1 comprising:

i) a translatable specimen stage to support micron sized particles in a selective medium;

ii) a laser source operating in zero order Hermite Gaussian mode adapted to control the power of output laser beam;

iii) means to direct the said laser beam toward an area of stage where said particles are located;

iv) means to focus the laser beam into an elliptical profile of desired dimension at the desired point on said stage;

v) means to provide the laser beam to the particles at controllable angles so as to vary the asymmetry of gradient optical forces about the mid-point of the major axis of the elliptic beam on the particle and transport the said particles along the major axis of the elliptical focus in the transverse plane perpendicular to direction of the propagation of laser beam;

vi) means to control the direction of transportation of the particles along the major axis of the elliptical focus in the transverse plane perpendicular to direction of the propagation of the laser beam;

vii) means to monitor the motion of said transported objects.

5. A system as claimed in claim 2 wherein said laser source has wavelength such that the microscopic objects/particles and said selective medium have low absorption at that wavelength.

6. A system as claimed in claim 3 wherein said means for focusing is adapted such that the external focusing elements determine the length of major axis along which the particles are to be transported.

7. A system as claimed in claim 4 comprising:

i) monitoring the direction, sense and speed of transportation of said objects, digitizing and recording video images of the objects;

ii) carrying analysis of successive said images for measuring directions and/or speed of transportation of said trapped objects;

iii) exciting/illuminating of transported objects labeled/unlabeled with fluorescence dyes and studying fluorescence or scattering of said objects.

8. A system as claimed in claim 1 comprising:

i) means to digitize and record video images of the object (s);

ii) means to carry analysis of successive said images for measuring direction and or speed of transportation of said trapped object(s);

iii) means to excite/illuminate the transported object labeled/unlabeled with fluorescence dyes and fluorescence/scattering studies of said object(s).

9. A system as claimed in claim 1 wherein said laser source is any one or more of diode lasers, Ti: Sapphire lasers, Nd:YAG lasers, selected to operate in zero order Hermite-Gaussian mode, producing a laser beam in wavelength ranging from 800-1100 nm.

10. A system as claimed in claim 3 wherein, said means to direct laser beam towards desired location on the stage comprise means selected from mirrors and/or single mode optical fibers and lens(es).

11. A system as claimed in claim 3 wherein said means to focus the laser beam into an elliptic profile of desired dimension comprises an external single cylindrical lens or a combination of cylindrical lenses and/or a combination of spherical and cylindrical lenses of proper focal lengths and an objective preferably 100×.

12. A system as claimed in claim 1 wherein, means to transport and control the speed of transportation of the said microscopic object(s) comprise of external coupling optics adapted to control the angle of the laser beam with respect to the optic axis of the microscope objective.

13. A system as claimed in claim 11 wherein, means to control the direction of transportation of the said microscopic object(s) houses any one or more of the external single cylindrical lens, a combination of cylindrical lenses, a combination of spherical and cylindrical lenses of proper focal lengths in a rotating mount.

14. A system as claimed in claim 3 comprising said translatable specimen stage; a coverslip to place the microscopic objects; an illuminator preferably a halogen lamp; a condenser to focus visible light to said specimen on said stage as in conventional microscope; said laser source comprising of a laser operating in zeroth order Hermite-Gaussian mode adapted to control the optical beam power; a beam expander; a beam tilting device; said means to direct said laser beam towards an area of said stage where said objects are located, comprising a cylindrical lens or combination of cylindrical lenses kept in a rotating mount adapted to be rotated until alignment of the major axis of said laser beam at the desired angle in the transverse plane; a coupling mirror; a dichroic beam splitter; a spherical lens; a 100×microscope objective; said means to digitize and record video images of said object comprising a cutoff filter to block the laser light; a commercial video CCD camera; a video cassette and a VCR; a frame grabber and a computer and a display screen/monitor; said means to carry analysis of successive said images for measuring direction and or speed of transportation of said object (s) comprising a frame grabber and a computer and a display screen/monitor; said means to excite/illuminate the transported object labeled/unlabeled with fluorescence dyes and fluorescence/scattering studies of said transported object(s) comprises a lamp/laser to excite/illuminate fluorescent labeled/unlabeled object(s); a dichroic mirror to reflect the excitation beam and transmit the fluorescence; a set of band pass filters containing excitation and emission filters.

15. A method for transport of microscopic objects comprising:

i) providing said micron sized particle(s) on at least one specimen stage;

ii) operating at least one laser source operatively connected to microscope objective such as to generate focal spots on said particles with an asymmetric intensity profile in a transverse plane; and iii) varying the asymmetry of the gradient optical forces on the micron sized particles to thereby transport the microscopic object at varying speeds;

characterized in that said gradient optical forces are asymmetric about the mid point of the major axis of an elliptic laser beam, such that said system for transport of the objects/particles is adapted to allow control of both direction and speed of transport of said object where the speed of particle transport is controllable by regulating the optical beam power and/or by varying the degree of asymmetry in the intensity profile of said elliptic laser beam and where the direction of particle transport is adapted to be controlled by rotating the direction of the major axis of said elliptic laser beam until alignment with the desired angle in the transverse plane.

16. A method for transport of microscopic objects as claimed in claim 15 comprising:

i) providing the micron sized particle(s) in a translatable specimen stage;

ii) operating a laser source in zero order Hermite Gaussian mode and controlling the power of output laser beam;

iii) directing the laser beam toward an area of stage where said objects are located;

iv) focusing the laser beam into an elliptical profile of desired dimension at the desired point on said stage;

v) providing the laser beam to the microscope objectives at controlled angles so as to vary the asymmetry of gradient optical forces about the mid-point of the major axis of the elliptic beam on the particles and transport the particles along the major axis of the elliptical focus in the transverse plane perpendicular to direction of the propagation of laser beam.

17. A method for transportation of particles as claimed in claim 15 using a system comprising at least one specimen stage to support microscopic object/particles; at least one laser source; said laser source operatively connected to a microscope objective and adapted to generate gradient optical forces on the microscopic object/particles to thereby transport the microscopic object; characterized in that said gradient optical forces are asymmetric about the mid point of the major axis of an elliptic laser beam, such that said system for transport of the objects/particles is adapted to allow control of both direction and speed of transport of said object where the speed of particle transport is controllable by regulating the optical beam power and/or by varying the degree of asymmetry in the intensity profile of said elliptic laser beam and where the direction of particle transport is adapted to be controlled by rotating the direction of the major axis of said elliptic laser beam until alignment with the desired angle in the transverse plane; wherein said method comprises:

i) providing the micron sized particles on a translatable specimen stage;

ii) operating a laser source in zero order Hermite Gaussian mode and controlling the power of output laser beam iii) directing the said laser beam towards an area of stage where said objects are located;

iv) focusing the laser beam into an elliptical profile of desired dimension at the desired point on said stage;

v) providing the laser beam to the microscope objective at controlled angles so as to vary the asymmetry of gradient optical forces about the mid-point of the major axis of the elliptic beam on the particle and transport the particles along the major axis of the elliptical focus in the transverse plane perpendicular to direction of the propagation of laser beam;

vi) controlling the direction of transportation of the said microscopic objects along the major axis of the elliptical focus in the transverse plane perpendicular to direction of the propagation of the laser beam; and vii) monitoring the motion of said transported objects.

18. A method for transport of microscopic objects as claimed in claim 15 for studying fluorescence/scattering of said objects comprising:

i) supporting micron sized particles in said translatable specimen stage and illuminating the same;

ii) selecting the laser wavelength such that the objects to be transported have low absorption at the wavelength and also have refractive index higher than that of the medium;

iii) controlling the power of output laser beam;

iv) directing the laser beam toward an area of the stage where the objects are located;

v) focusing of the laser beam into an elliptical profile of the desired dimension at the desired point on the said stage;

vi) providing the laser beam to the microscope objective at controlled angles so as to exert gradient optical forces asymmetric about the mid-point of the major axis of the elliptic beam on the particle;

vii) placing a single or multiple microscopic objects on said stage near the region of high intensity gradient of the elliptical shaped focal spot of said laser beam;

viii) transporting the particles along the major axis of the elliptical focus in the transverse plane perpendicular to direction of propagation of the laser beam;

ix) controlling the direction of transportation of the microscopic objects along the major axis of the elliptical focus in the transverse plane perpendicular to direction of propagation of the laser beam;

x) monitoring the direction, sense and speed of transportation of said objects, digitizing and recording video images of the objects;

xi) carrying analysis of successive said images for measuring directions and/or speed of transportation of said trapped objects;

xii) exciting/illuminating transported objects labeled/unlabeled with fluorescent dyes and studying fluorescence/scattering of said objects.

19. A method for transport of microscopic objects as claimed in claim 15 comprising:

i) holding micron sized particles and illuminating the same;

ii) selecting the laser wavelength such that the objects to be transported have low absorption at the wave length and also have refractive index higher than that of the medium;

iii) arrangement for controlling the power of output laser beam;

iv) directing the laser beam toward an area of the stage where the objects are located;

v) focusing of the laser beam into an elliptical profile of the desired dimension at the desired point on the said stage;

vi) sending the laser beam to the microscope objective at controllable angles so as to exert gradient optical forces asymmetric about the mid-point of the major axis of the elliptic beam of the particle;

vii) placing a single said microscopic objects or number of said microscopic objects on said stage near the region of high intensity gradient of the said elliptical shaped focal spot of said laser beam;

viii) transporting these along the major axis of the elliptical focus in the transverse plane perpendicular to direction of propagation of laser beam;

ix) controlling the direction of transportation of the microscopic objects along the major axis of the elliptical focus in the transverse plane perpendicular to direction of propagation of the laser beam;

x) monitoring the direction, sense and speed of transportation of said objects, digitizing and recording video images of the objects;

xi) carrying analysis of successive said images for measuring directions and/or speed of transportation of said trapped objects;

xii) exciting/illuminating transported objects labeled/unlabeled with fluorescence dyes and studying fluorescence/scattering of said objects.

20. A method as claimed in claim 15 wherein the object/particles used are microscopic objects preferably selected from individual biological cells; intra-cellular organelles and other objects with refractive index higher than that of the surrounding medium.

21. A method for transport of microscopic object(s) as claimed in claim 19 comprising the steps of: holding micron-sized particle(s); illuminating them; the laser wavelength is chosen such that the objects to be transported have low absorption at the wavelength and also have refractive index higher than that of the medium; arrangements for controlling the power of the output laser beam; directing the laser beam towards an area of the stage where the objects are located; focusing of the said laser beam into an elliptical profile of desired dimension at the desired point on the said stage; sending the laser beam to the microscope objective at controllable angles so as to exert gradient optical forces asymmetric about the mid-point of the major axis of the elliptic beam on the particles; placing a single said microscopic object, or number of said microscopic objects on said stage near the region of high intensity gradient of the said elliptically shaped focal spot of said laser beam; and transporting these along the major axis of the elliptical focus in the transverse plane perpendicular to direction of propagation of the laser beam; controlling the direction of transportation of the said microscopic object(s) along the major axis of the elliptical focus in the transverse plane perpendicular to direction of propagation of the laser beam characterized in that said direction of transport is adapted to be controlled by rotating the direction of the major axis of said elliptic laser beam until alignment with the desired angle in the transverse plane; monitoring the direction, sense and speed of transportation of said object(s); digitizing and recording video images of the object(s); carrying analysis of successive said images for measuring direction and or speed of transportation of said trapped object(s); exciting/illuminating the transported object labeled/unlabelled with fluorescence dyes and studying fluorescence/scattering of said object(s).

* * * * *